(12) United States Patent
Thorpe

(10) Patent No.: US 7,014,468 B1
(45) Date of Patent: Mar. 21, 2006

(54) VISUAL TEACHING AID

(76) Inventor: Martha Thorpe, 25248 Pleasant Tr., Cleveland, OH (US) 44143

( * ) Notice: Subject to any disclaimer, the term of this patent is extended or adjusted under 35 U.S.C. 154(b) by 0 days.

(21) Appl. No.: 10/987,464

(22) Filed: Nov. 15, 2004

(51) Int. Cl.
G09B 19/02 (2006.01)

(52) U.S. Cl. .................................................... 434/188
(58) Field of Classification Search ................ 434/188, 434/190, 191, 193, 194, 195, 198, 205, 215; 273/155; 416/71
See application file for complete search history.

(56) References Cited

U.S. PATENT DOCUMENTS

| 271,749 | A | | 2/1883 | Stewart |
| 886,172 | A | * | 4/1908 | Bevans ........................ 434/176 |
| 1,244,000 | A | * | 10/1917 | Soltoft ........................ 434/205 |
| 2,635,355 | A | | 4/1953 | Thompson et al. |
| D173,363 | S | * | 11/1954 | Louis ........................... D19/64 |
| 3,229,388 | A | * | 1/1966 | Smith .......................... 434/195 |
| 3,276,151 | A | | 10/1966 | Smith |
| 3,414,986 | A | * | 12/1968 | Stassen et al. ............... 434/195 |
| 3,758,962 | A | | 9/1973 | Bagdasar |
| 4,382,794 | A | * | 5/1983 | Preus ........................... 434/193 |
| 4,548,585 | A | | 10/1985 | Kelly |
| 4,846,689 | A | | 7/1989 | Day |
| 5,066,234 | A | * | 11/1991 | LeDesma ..................... 434/205 |
| 5,137,452 | A | | 8/1992 | Pollock |
| 5,167,505 | A | * | 12/1992 | Walsh .......................... 434/205 |
| 5,176,577 | A | | 1/1993 | Pollock |
| 5,238,407 | A | | 8/1993 | Pollock |
| 5,238,408 | A | | 8/1993 | Pollock |
| 5,597,308 | A | | 1/1997 | Woldenberg et al. |
| 5,683,252 | A | | 11/1997 | Tsao |
| 5,725,380 | A | | 3/1998 | Kennelly |
| 5,749,734 | A | | 5/1998 | Kohlberg |
| 5,769,639 | A | | 6/1998 | Foster |
| 6,209,875 | B1 | * | 4/2001 | Vildosola ..................... 273/302 |
| 6,575,754 | B1 | * | 6/2003 | Salvo .......................... 434/195 |
| 6,739,875 | B1 | * | 5/2004 | Lin ............................. 434/195 |

* cited by examiner

Primary Examiner—Kurt Fernstrom
(74) Attorney, Agent, or Firm—Fay, Sharpe, Fagan, Minnich & McKee, LLP

(57) ABSTRACT

An aid for teach addition and subtraction comprises a single counting member representing a single digit, and consecutive sets of counting members progressing numerically from two members to ten members. The members of each set are interconnected for pivotal displacement relative to one another, and each counting member is provided with shape and color indicia.

8 Claims, 5 Drawing Sheets

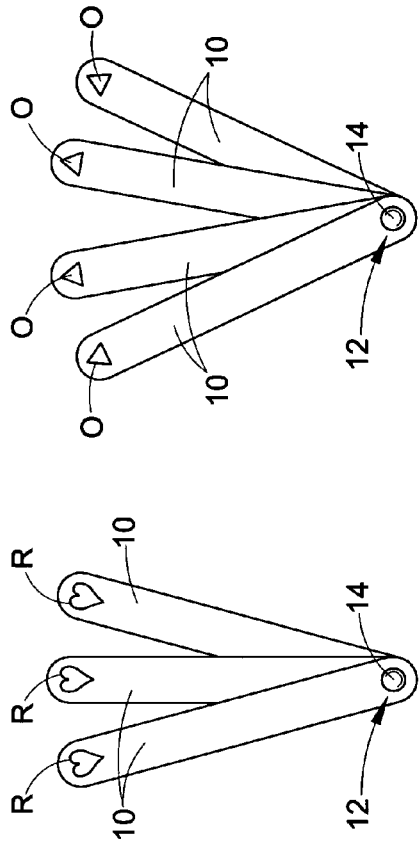
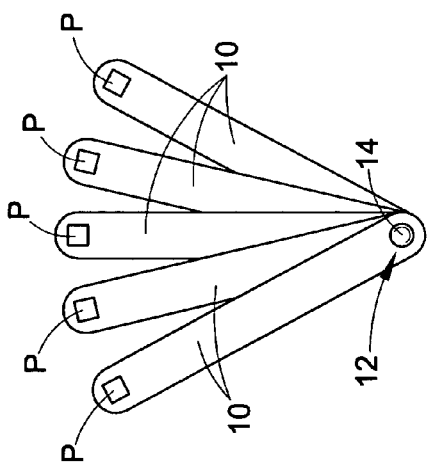

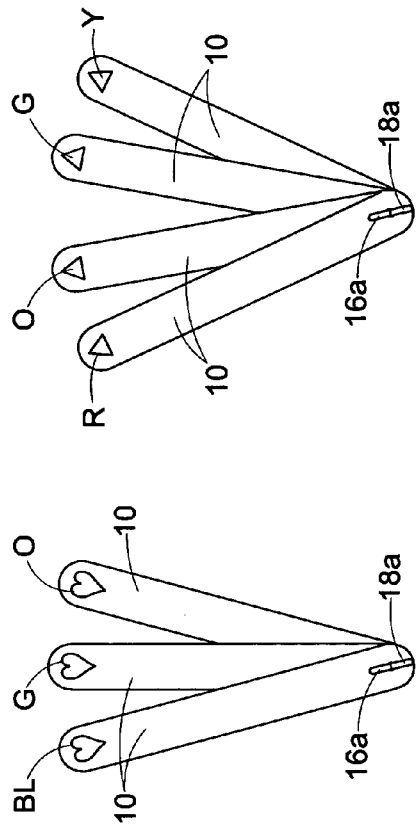
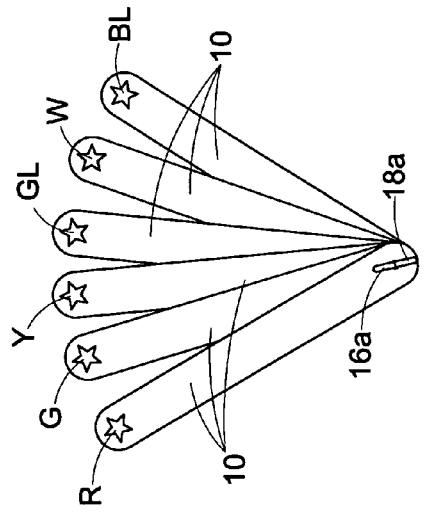
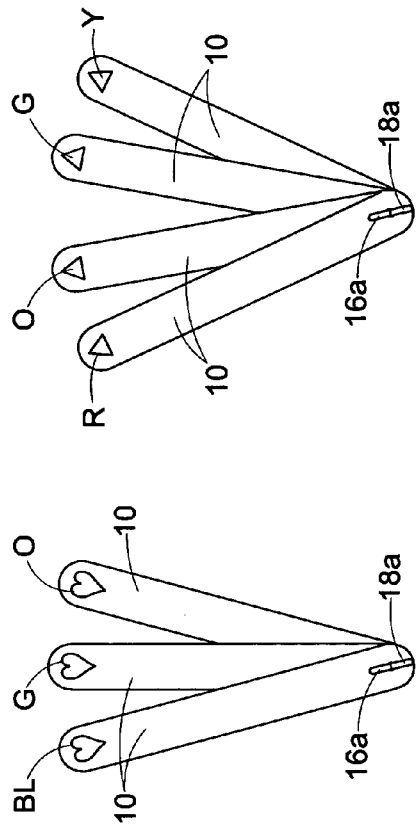
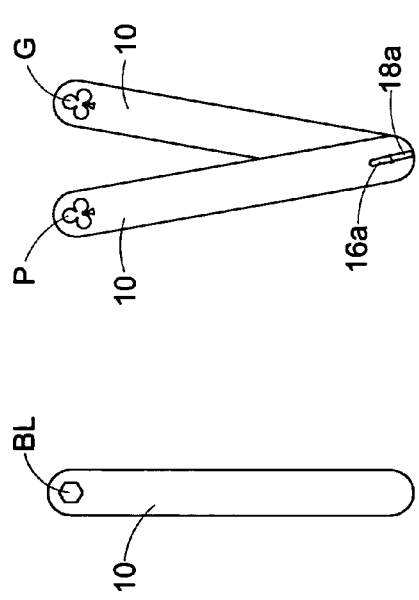
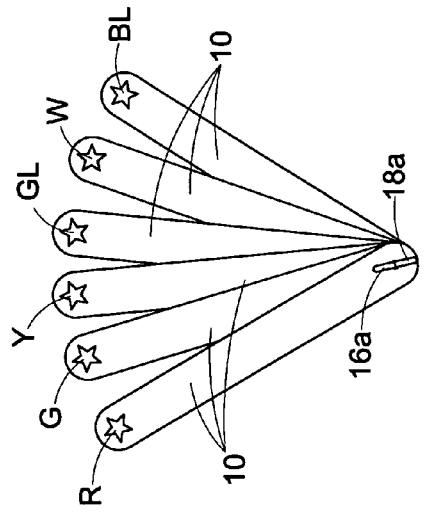
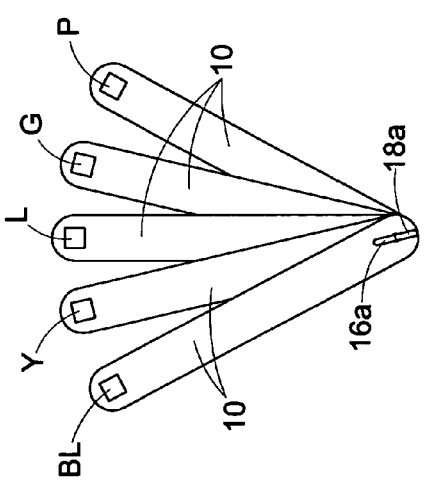

VISUAL TEACHING AID

BACKGROUND OF THE INVENTION

This invention relates to the art of education and, more particularly, to aids in teaching mathematics, colors, shapes, and the like.

Teaching aids have been provided heretofore for teaching mathematics including addition and subtraction and for teaching colors, shapes and the like. Such teaching aids are shown, for example, in U.S. Pat. No. 3,758,962 to Baddasar and in U.S. Pat. Nos. 5,137,452; 5,176,577; 5,238,407; and 5,238,408 to Pollock. While such teaching aids heretofore proposed serve their intended purpose, they comprise a multiplicity of component parts which are separate from one another and which must be individually manipulated into groups with respect to teaching mathematics. Additionally, in being comprised of a multiplicity of parts, the aids, often in the form of kits, are somewhat structurally complex, expensive and difficult to use. In particular in this respect, the aids are most useful in one-on-one teaching situations and do not readily lend to teaching groups of students, such as in a classroom.

SUMMARY OF THE INVENTION

In accordance with the present invention, a teaching aid is provided by which mathematics such as addition and subtraction is taught through visual aids which, advantageously, simultaneously provide the ability to teach colors, shapes and the like. More particularly in accordance with the invention, a plurality of counting members each representing a single counting unit, are associated and interrelated to provide, basically, a progression of the counting members beginning with a single member and following with pluralities of the members progressively increasing in number from 2 to 10. The members in each of the sets from 2 to 10 are interconnected for displacement relative to one another to facilitate various combinations of the members in each set in connection with addition and subtraction factors. Moreover, each of the members is provided with shape and color indicia which, in connection with teaching addition and subtraction teaches a variety of shapes and colors. Each of the sets of counting members is adapted to be manipulated by a teacher and/or by students and, accordingly and advantageously, provides a visual aid which is usable in a classroom situation involving multiple pupils. Moreover, the interconnection of the counting members in each of the several sets of counting members minimizes the number of parts in a kit or the like which have to be accounted for and avoids the possibility of the separation, misplacement or loss of the individual counting members.

It is accordingly an outstanding object of the present invention to provide a visual aid for teaching addition and subtraction.

Another object is the provision of an aid of the foregoing character, which additionally provides for teaching colors, shapes and the like.

A further object is the provision of an aid of the foregoing character wherein pluralities of counting members in sets progressing from 2 to 10 are interconnected so as to minimize the number of component parts in the teaching aid as a unit and to avoid the potential for misplacing or losing parts of a given set of counting members.

BRIEF DESCRIPTION OF THE DRAWINGS

The foregoing objects, and others, will in part be obvious and in part pointed out more fully hereinafter, in conjunction with the written description of a preferred embodiment of the invention illustrated in the accompanying drawings in which:

FIGS. 1A–1J illustrate a sequence of counting members from 1 and then, progressively, in sets of 2 to 10 counting members;

FIGS. 2A–2J illustrate the opposite sides of the same sequence of counting members shown in FIGS. 1A–3J;

DESCRIPTION OF A PREFERRED EMBODIMENT

Figure 1G:
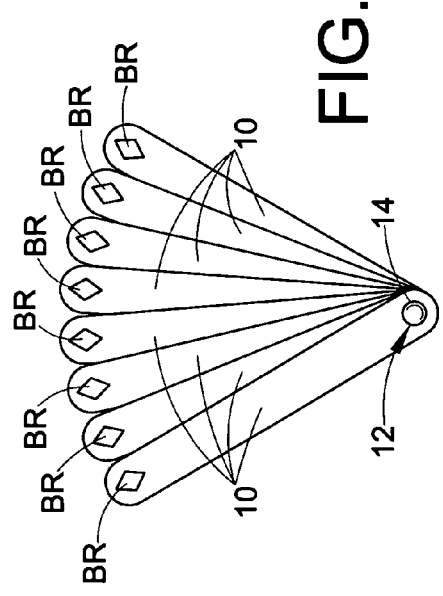
Figure 3:
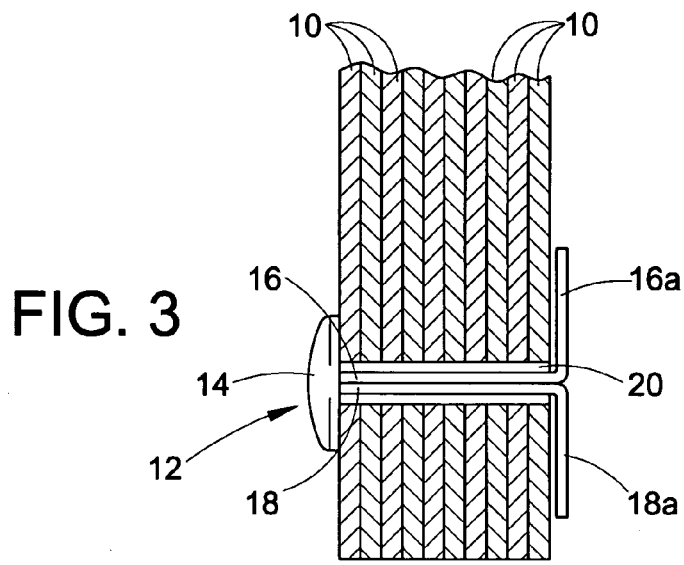
FIG. 3 is an enlarged cross-sectional view taken along Line 3—3 in FIG. 1J; and, FIGS. 4A and 4B illustrate displacements of the counting members in the set shown in FIG. 2E used in connection with teaching addition and subtraction using this set of counting members.

Referring now in greater detail to the drawings, wherein the showings are for the purpose of illustrating a preferred embodiment of the invention only, and not for the purpose of limiting the invention, FIG. 1A illustrates a counting member 10 which represents a single counting unit, and FIGS. 1D–1J sequentially illustrate a progression of 2 to 10 of the counting members 10 having first or lower ends, not designated numerically, suitably interconnected for pivotal displacement relative to one another by a pivot pin member 12. Any suitable pin or the like can be used, and in the embodiment disclosed, as shown in FIG. 3, the pivotal interconnection is achieved through the use of a notebook-type brass fastener having a head 14 engaging against the outer side of one of the members 10 and flat legs 16 and 18 extending through openings 20 therefor in the members 10 and having outer ends 16a and 18a bent laterally outwardly against the outer side of the counting member at the opposite end of the set.

In the preferred embodiment, counting members 10 are wooden tongue depressors having a length of about six inches, a width of about ¾ inch and a thickness of about ¹⁄₁₆ inch. However, it will be appreciated that the counting members can be made of metal, plastic or wood in a form other than tongue depressors and, likewise, it will be appreciated that the counting members can be pivotally interconnected in a manner other than that described above and, for example, by rivets or matingly threaded sleeve and bolt elements which threadedly interengage to provide a pivot pin component having an axially adjustable length.

Figure 1H:
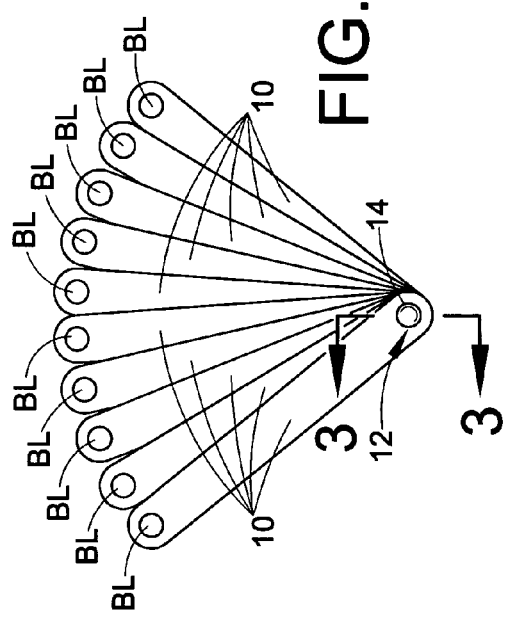
Figure 1I:
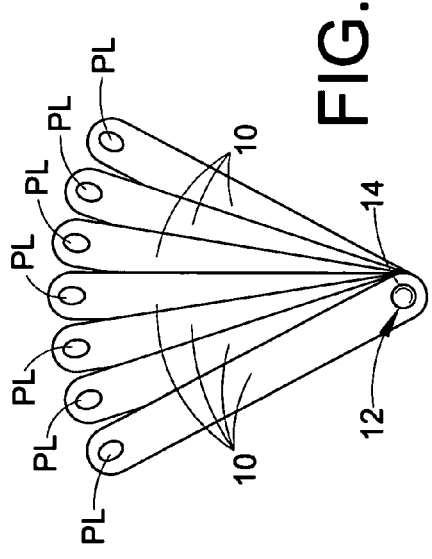
Figure 1J:
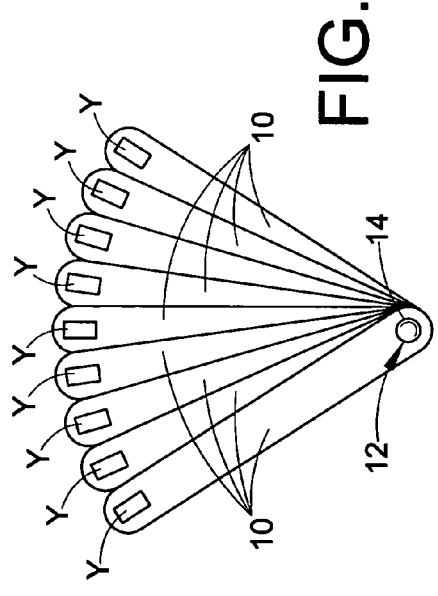

Preferably, as shown in FIGS. 1A–1J, the second or upper ends of the counting members are provided with indicia on one of the opposite sides thereof and in the form of one or the other or both of a shape and a color. Further in this respect, the indicia on the counting members in each set of counting members in FIGS. 1B–1J are like indicia, preferably with respect both to shape and color. Further, preferably but not necessarily, the indicia in each of the sets is different from that of the other sets, at least in shape and, preferably, in both shape and color. The latter is shown in FIGS. 1B–1J wherein, beginning with FIG. 1B, the two counting members 10 are provided with a clover shape which is colored green as represented by G. Similarly, the three counting members in FIG. 1C are provided with the shape of a heart, each of which is colored red (R), the four counting members in FIG. 1D are provided with a triangle shape, each of which is colored orange (O), and the five counting members in FIG. 1E are provided with a square shape, each of which is colored pink (P). Continuing, the six counting members in FIG. 1F are provided with a star shape, each of which is colored white (W), the seven counting members in FIG. 1G are provided with an oval shape, each of which is colored purple (PL), the eight counting members in FIG. 1H are provided with a diamond shape, each of which is colored brown (BR), the nine counting members in FIG. 1I are provided with a rectangular shape, each of which is colored yellow (Y), and the ten counting members in FIG. 1J are provided with a shape in the form of a circle, each of which is colored blue (BL). The single counting member 10 in FIG. 1A is provided with a hexagon which is colored black (B).

Figure 4A:
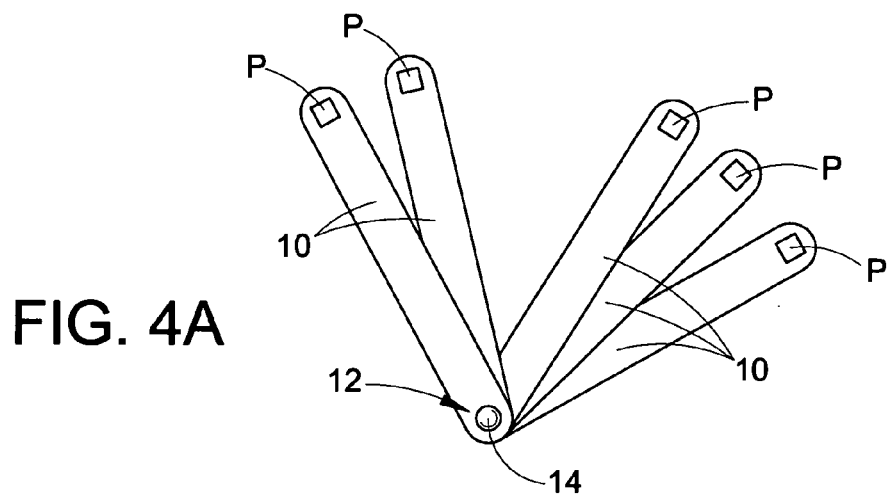
Figure 4B:
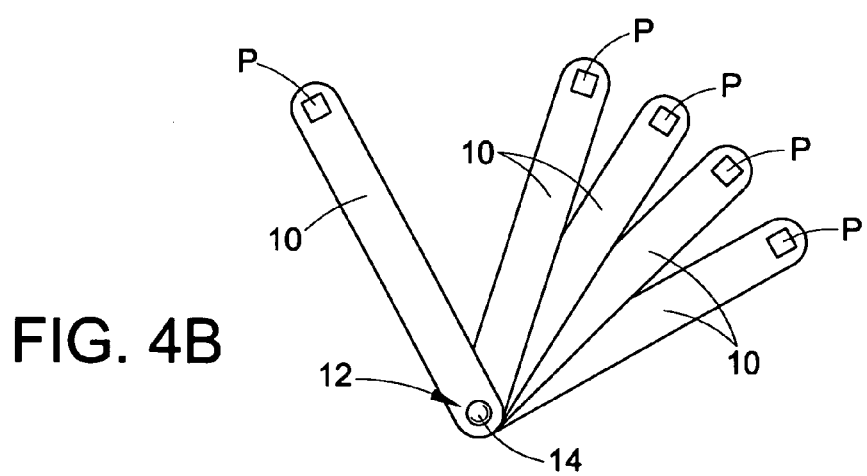

In use, with respect for example to the set of five counting members shown in FIG. 1E, and manipulations of the counting members in this set shown in FIGS. 4A and 4B, a teacher can separate the counting members in the set into one group of two and another group of three, as shown in FIG. 4A to visually show that 2+3=5, or that 3+2=5, or that 5−3=2, or that 5−2=3. The teacher can, of course, verbally ask the questions with regard to the addition and subtraction concepts. With the same set of five counting members, and as shown in FIG. 4B, the teacher can visually demonstrate that 1+4=5, that 4+1=5, that 5−1=4, and that 5−4=1. From the foregoing discussion of the set of five counting members shown in FIG. 1E, it will be appreciated that a teacher can use each of the individual sets shown in FIGS. 1B–1J to teach the concepts of addition and subtraction with respect to each of the sets of counting members. It is preferred, as mentioned above, that the indicia at the upper ends of the counting members as shown in FIGS. 1B–1J are, in each set, like indicia with respect both to shape and color. In particular in this respect, and again with reference to FIGS. 4A and 4B, this facilitates a teacher referencing the addition and subtraction concepts with respect, for example, to "2 pink squares+3 pink squares=5 pink squares." With further regard to the indicia on the upper ends of the counting members in each set being of the same shape and color, and the shapes and colors of the indicia in each of the sets being different from the others, this provides a teacher with the additional opportunity to visually teach different shapes and different colors to the students in connection with teaching the mathematical concepts.

Figure 2G:
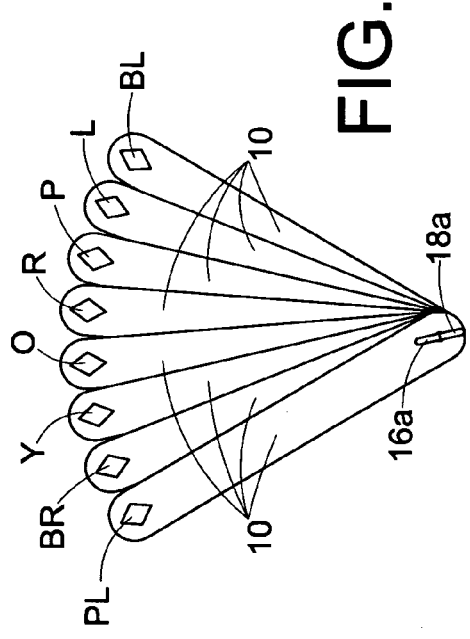
Figure 2H:
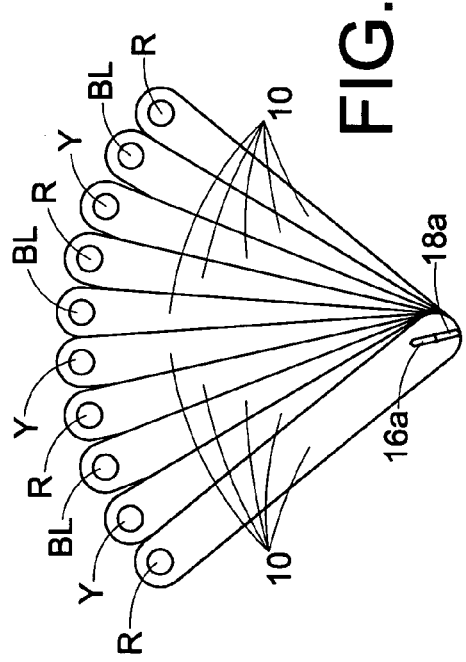
Figure 2I:
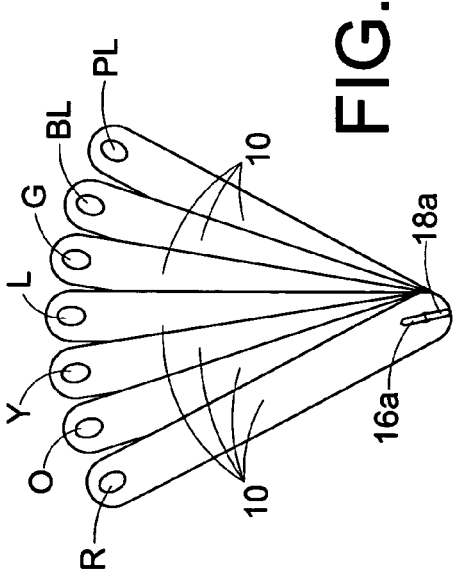
Figure 2J:
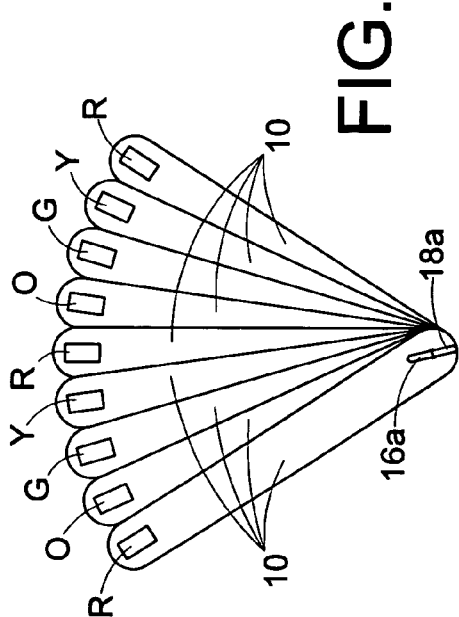

FIGS. 2A–2J illustrate the opposite sides of the counting member and sets of counting members shown in FIGS. 1A–1J, respectively. Preferably, as shown in FIGS. 2A–2J, these sides of the counting member and sets of counting members have the same shape of indicia as on the sides thereof shown in FIGS. 1A–1J. Preferably, however, the shaped indicia on these sides of the counting members in each of the sets have different colors as opposed to the preferred same colors as shown in FIGS. 1A–1J. Thus, for example, the hexagon on counting member 10 in FIG. 2A is blue (BL), the clovers in FIG. 2B are pink (P) and green (G). The different colors shown in the various sets of counting members in FIGS. 2B–2J are designated by the same letters as set forth above in connection with FIGS. 1A–1J, and in FIGS. 2A–2J additional colors of gold (GL) and lime (L) are used. This arrangement advantageously enables a teacher, independent of mathematical concepts, to teach shapes and/or colors to students. Be that as it may, FIGS. 2I and 2J show a further ability to incorporate mathematical concepts into the use of the opposite sides of the counting members from that shown in FIGS. 1B–1J. In this respect, as will be appreciated from 21, for example, the latter includes 3 rectangles which are colored red (R), two rectangles which are colored orange (O), two rectangles which are colored green (G), and two rectangles which are colored yellow (Y). Thus, for example, a teacher can visually demonstrate that 3(R)+2(O)+2(G)+2(Y)=9.

While it is preferred to provide the opposite sides of the counting members with indicia as shown in FIGS. 2A–2J and described above, it will be appreciated that the sides of the counting members shown in the latter figures can be left blank.

In addition to teaching mathematical concepts in connection with addition and subtraction using all the combinations from 1 to 10 provided by the counting member and sets of counting members shown in FIGS. 1A–1J, teaching addition and subtraction beyond 10 is possible by using bundles of ten counting members in combination with counting member 10 and the sets of counting members shown in FIGS. 1B–1J. For example, a bundle of ten counting members 10 plus the counting member set shown in FIG. 1B can be used to teach that 10+2=12. Similarly, using additional bundles of ten counting members, two bundles of ten equal 20, three bundles of ten equal 30, and so on up to 100 with the additional use of counter member 10 and the sets in FIGS. 1B–1J for the combinations within each bundle of ten to the next additional bundle.

In addition to a teacher visually demonstrating and verbally teaching addition and subtraction concepts using the counting member and sets of counting members described hereinabove, students can have like sets of counting members to physically manipulate together with the teacher as part of the learning process. In this respect, an advantage of the teaching aid described herein in the form of a counting member and sets of counting members which are pivotally interconnected with one another is that the counting members are large enough for a group of children to see as a teacher demonstrates the mathematical concepts, and are large enough for young children to handle and manipulate with ease. Furthermore, the teaching aid is comprised of a minimum number of separate components which promotes ease of use and storage as well as minimizing the misplacement of the components in a classroom environment.

While considerable emphasis has been placed herein on the preferred embodiment, it will be appreciated that other embodiments of the invention can be made and that many changes can be made in the preferred embodiment without departing from the principles of the invention. In particular in this respect, it will be appreciated that indicia in the form of shapes can include, for example, shapes of fruits, vegetables, animals, and the like and that, while preferred, the indicia on the sides of the counting members illustrated in FIGS. 2A–2J do not have to be of the same shape as the indicia on the sides shown in FIGS. 1A–1J. These and other changes in the preferred embodiment as well as other embodiments of the invention will be obvious and suggested from the foregoing description, whereby it is to be distinctly understood that the foregoing descriptive matter is to be interpreted merely as illustrative of the invention and not as a limitation and that it is intended to include all embodiments and modifications of the preferred embodiments insofar as they come within the scope of the appended claims or the equivalent thereof.

Having thus described the invention, it is so claimed:

1. A teaching aid comprising one counting member representing a single digit, and sets of two, three, four, five, six, seven, eight, nine, and ten counting members each representing a single counting unit, the counting members of each set being pivotally interconnected for displacement relative to one another in the corresponding set, the one counting member and the counting members in each set having first and second sides, the first side of said one counting member and the first sides of the counting members in each set having indicia thereon including a shape and a color, the shape and color on the first sides of the counting members in each set being the same and being different from the shape and color of the indicia on the first side of the one counting member and the first sides of the counting members in each of the other sets, and the second sides of the one counting member and the counting members in each set having indicia thereon including the same shape as is on the first side of the corresponding counting member, and the indicia on the second sides of the one counting member and the counting members in each set including a color.

2. A teaching aid according to claim 1, wherein the colors on the second sides of the counting members in each set include colors different from one another.

3. A teaching aid according to claim 1, wherein said one counting member and the counting members of each set have first and second ends, said counting members of each set being pivotally interconnected at said first ends thereof and the indicia on said first and second sides being on the second ends of said one counting member and the counting members in each set.

4. A teaching aid according to claim 3, wherein the colors on the second sides of the counting members in each set include colors different from one another.

5. A teaching aid according to claim 4, wherein the one counting member and the counting members in each set are planar and of equal length between said first and second ends and equal width between said ends, said first ends of the members in each set being interconnected for pivotal displacement about an axis transverse to the planes of the counting members.

6. A teaching aid comprising, a set of ten counting members each representing a single counting unit and having first and second ends and first and second sides, said counting members being pivotally interconnected at said first ends for displacement relative to one another, indicia on the first side of each counting member of the second end thereof, said indicia being indicative of the single digit and including the same shape and the same color on each counting member, and indicia on the second side of each counting member at the second end thereof and including the same shape as the shape on the first side.

7. A teaching aid according to claim 6, wherein the indicia on the second side of each counting member includes a color.

8. A teaching aid according to claim 7, wherein the indicia on the second sides of the counting members includes colors different from one another.

* * * * *